United States Patent [19]

Furman, Jr. et al.

[11] Patent Number: 5,382,323
[45] Date of Patent: Jan. 17, 1995

[54] CROSS-LINKED POLY(AMINOAMIDES) AS YANKEE DRYER ADHESIVES

[75] Inventors: Gary S. Furman, Jr., St. Charles; James F. Kneller, La Grange Park; Kristy M. Bailey, Batavia; Martha R. Finck, Countryside; Winston Su, Naperville, all of Ill.

[73] Assignee: Nalco Chemical Company, Naperville, Ill.

[21] Appl. No.: 201,285

[22] Filed: Feb. 22, 1994

Related U.S. Application Data

[62] Division of Ser. No. 1,997, Jan. 8, 1993, abandoned.

[51] Int. Cl.$^6$ .............................................. D21H 25/04
[52] U.S. Cl. .................................... 162/111; 162/112
[58] Field of Search ................ 162/164.3, 164.6, 166, 162/111, 112

[56] References Cited

U.S. PATENT DOCUMENTS

| | | | |
|---|---|---|---|
| 3,250,664 | 5/1966 | Conte et al. | 162/164.6 |
| 3,607,622 | 9/1971 | Espy | 162/164.6 |
| 3,773,736 | 11/1973 | Coscia | 162/164.6 |
| 4,308,092 | 12/1981 | Latimer et al. | 162/111 |
| 5,179,150 | 1/1993 | Furman, Jr. et al. | 162/112 |

OTHER PUBLICATIONS

Literature Search Report, "Adipic Acid/Diethylenetriamine Crosslinked With Glyoxal", No. 3594, Jun. 24, 1991 Glyoxal, pp. 1–31.

Primary Examiner—Peter Chin
Attorney, Agent, or Firm—Robert A. Miller; James J. Drake

[57] ABSTRACT

Improved halogen-free Yankee Dryer adhesives based on cross linked cat ionic polyaminoamide polymers are described. The adhesives are obtained by crosslinking a backbone cationic polymer formed by reacting a difunctional carboxylic acid with a polyamine containing at least one secondary amine, said crosslinking achieved by the use of a multi-functional aidehyde. The preferred adhesive is that obtained by reacting adipic acid with diethylenetriamine, at essentially equimolar ratios of from about 1.2: 1.0 to about 1.0: 1.2, and then crosslinking with a dialdehyde selected from glutaraldehyde, glyoxal, or mixtures thereof. Improved adhesion and peel strength are obtained when using the new materials as compared to materials now commercially used.

8 Claims, 1 Drawing Sheet

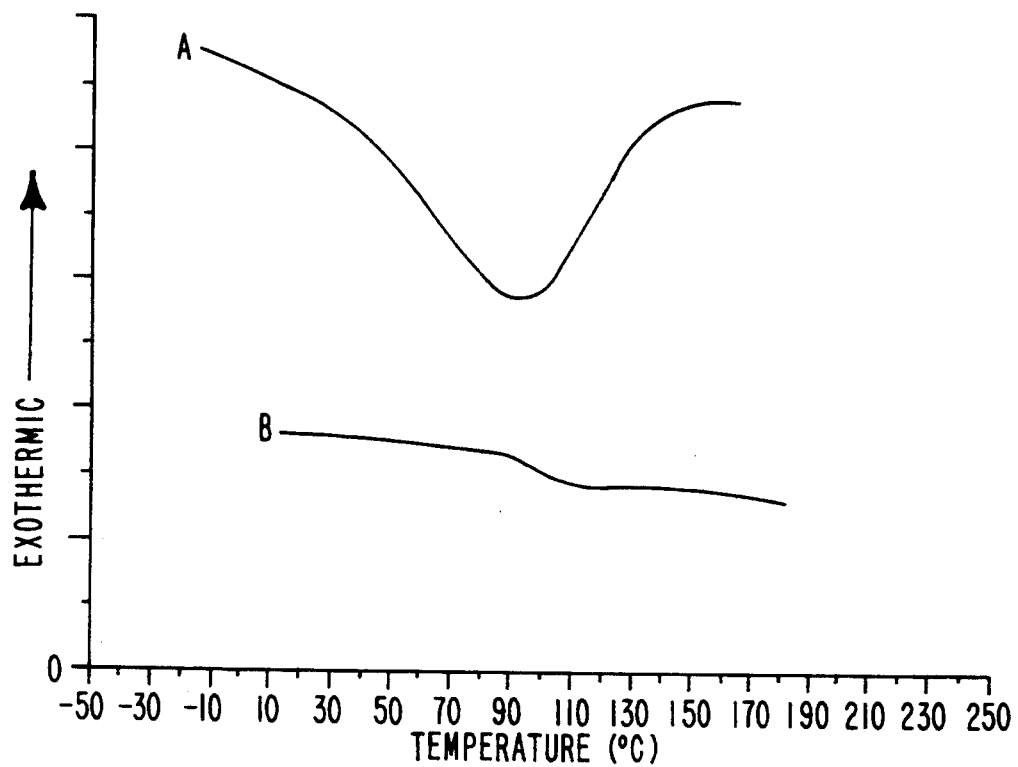
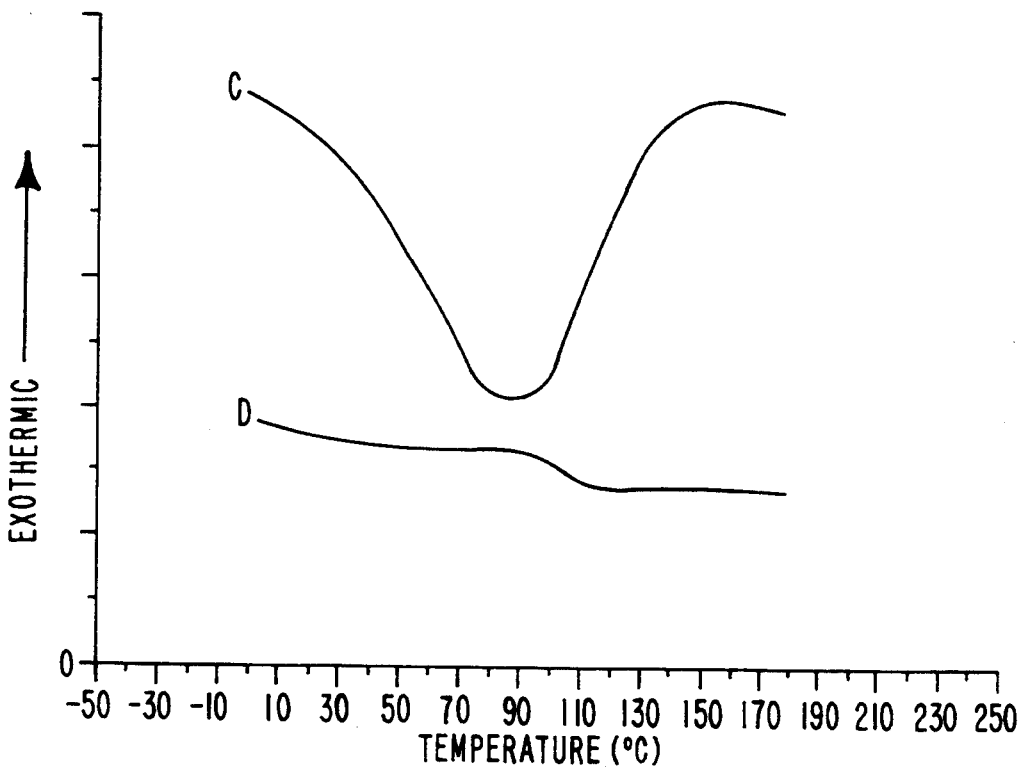

CROSS-LINKED POLY(AMINOAMIDES) AS YANKEE DRYER ADHESIVES

This application is a division of application Ser. No. 08/001,997, filed Jan. 8, 1993 now abandoned.

In the manufacturing of paper tissues, the paper sheet is formed on a fourdrinier or twin wire, i.e. a continuous wire, then transferred via a felt to a steam heated cylinder and dried thereon. Adhesive materials are used to adhere the wet sheet to the metal surfaces of the dryer thereby improving heat transfer and increasing efficiency of the drying process of the wet paper sheet. These so called Yankee Dryer adhesives not only provide the necessary adhesion but also:, provide what is referred to as good creping.

Creping is defined as the process of impacting the sheet onto or into a metal blade thereby compacting the sheet in the machine direction and producing a folding action. Creping often destroys a large number of fiber to fiber bonds in the paper sheet thereby imparting qualities of bulk, stretch, absorbency, and softness characteristics to the tissue paper being manufactured.

The amount of adhesion between the sheet and the metal surfaces of the dryer at the creping blade plays a significant role in the development of tissue properties. Soerens, in U.S. Pat. No. 4,501,640, has demonstrated that increased adhesion provided by creping adhesives (Yankee Dryer adhesives) gives increased softness to the manufactured tissue. Therefore, the ability to provide increased adhesion of the wet paper sheet to dryer metal is a desirable attribute for new creping adhesive chemistries.

In the past, common classes of thermosetting adhesive resins which have been used as Yankee Dryer adhesives have been represented by poly (amidoamine)-epichlorohydrin polymers (referred to as PAE resins), such as those polymers sold under the tradenames Kymene, Rezosol, Cascamid, and AMREZ. Each of these materials represent products sold respectively by the Hercules Chemical Company, the Houghton Company, The Borden Company, and Georgia-Pacific.

Although these materials are now in commercial use, improvements can be made to this basic PAE resin chemistry. Improvements can also be made by changing the chemistry to include other chemistries which have the capability of acting as a Yankee Dryer adhesive and providing improved adhesion between the metal and the paper sheet being manufactured as tissue.

It is, therefore, an object of the present invention that new chemistry be developed to act as Yankee Dryer adhesives.

It is the further object of this invention that the chemistries developed provide increased adhesion characteristics than the adhesion characteristics available through the use of poly(amidoamine)-epichlorohydrin polymers.

It is a further object of this invention that a halogen, particularly chloride, free Yankee Dryer adhesive be developed so as to prevent or inhibit chloride or halogen induced corrosion of the yankee drum surface.

It is a further object to form cationic cross-linked polymeric structures, free of halogen and particularly chloride, to act as yankee dryer adhesives. These cross-linked cationic polymers are formed by reacting polyaminoamides with dialdehydes to form the adhesives of this invention.

It is a further object of this invention to provide for variable adhesive characteristics by varying the amount of dialdehyde used to form the cross-linked cationic polymers, which provide adhesion between the metal surface of the yankee drum dryer and the paper web sheet in contact therewith.

PRIOR PRACTICES

Particular patents of interest, which patents outline various technologies used in this Yankee Dryer adhesive application are as follows:

1. U.S. Pat. No. 4,684,439, Soerens.
2. U.S. Pat. No. 4,501,640, Soerens.
3. U.S. Pat. No. 3,926,716, Bates.
4. British Patent 1,569,304, Latimer.
5. Canadian Patent 880,203, Winslow, et. al.
6. U.S. Pat. No. 3,640,841, Winslow, et. al.
7. U.S. Pat. No. 4,883,564, Chen, et. al.

All of the patents cited above are incorporated herein by reference.

None of the patents above incorporate the polymers of this invention which have been preferably cross-linked with glyoxal or glutaraldehyde to form the adhesive resins of the invention.

Additional Prior Art includes:

Oliver, J. F., "Dry Creping of Tissue Paper - a review of basic factors," Tappi 63, no. 12, 91–95 (1980). CA98(10): 74138w "Water soluble polymers and their use in crepe paper production"

BRIEF DESCRIPTION OF THE DRAWINGS

FIG. 1 presents differential scanning calorimeter (DSC) test results of one cross-linked cationic polymeric adhesive of this invention.

FIG. II presents another such test. (DSC)

THE INVENTION

We have invented a new thermosetting Yankee Dryer adhesive, which comprises a cross-linked cationic polyaminoamide containing polymer formed by reacting a polyaminoamide backbone polymer with a multifunctional aldehyde. The backbone polymer can be any water soluble or water dispersible polymer having been obtained by reacting a difunctional carboxylic acid or a difunctional carboxylic acid ester with a multifunctional amine compound.

The multifunctional aldehyde is any organic compound to which two or more aldehyde groups are covalently attached.

This new Yankee adhesive preferably comprises cross-linked cationic polymeric structures, such as those in Structure I below:

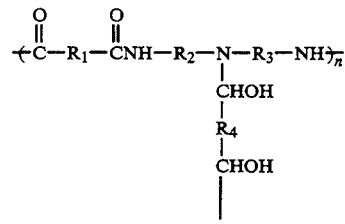

wherein $R_1$ is a linear or branched alkylene group containing from 1 to 8 carbon atoms;

$R_2$ and $R_3$ may be the same, or may be different, and are linear or branched alkylene groups containing from 2–8 carbon atoms; and $R_4$ is $(CH_2)_x$, wherein x is 0 to 6; and wherein n is a whole number of sufficient size to yield a molecular weight of at least 15,000.

The Yankee Dryer adhesive preferably comprises the reaction products of the backbone polyaminoamide polymers with from 0.1 molar ratio, to the copolymer repeating unit, of either the multifunctional aldehyde or the dialdehyde to about 1.1 molar ratio, to the copolymer repeating unit, of the multi-functional aldehyde, which aldehyde has been reacted with the base polymer which contains polyaminoamide polymers. Preferably, the base polymer is formed by reacting adipic acid with diethylenetriamine in mole ratios ranging from about 1.2:1.0 to 1.0:1.2.

Most preferably, the Yankee Dryer adhesive comprises a cationic polyaminoamide polymer cross-linked with from 0.2 to about 0.5 molar ratio of a difunctional aldehyde having the structure:

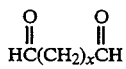

Wherein x ranges from 0 to 6. Most preferably the difunctional aldehyde is glutaraldehyde.

The Polyaminoamide Backbone Polymer

The polyaminoamide backbone polymer is made by condensing a difunctional carboxylic acid or ester with a multi-functional polyamine.

For example, a di-functional carboxylic acid having the structure:

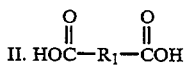

Wherein $R_1$ is a linear or branched alkylene group having from one to eight carbon atoms may be reacted with a polyamine having the structure: III .
$H_2N-R_2-NH-R_3-NH_2$
Wherein $R_2$ and $R_3$ may be the same or different and are linear or branched alkylene groups containing from 2–8 carbon atoms.

The backbone cationic polyaminoamide polymer is made up of dimeric repeating units, such as in the structure:

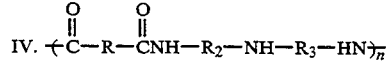

Wherein n is an integer providing a weight average molecular weight of at least 5,000, and preferably at least 7,500, or higher.

The above dicarboxylic acid is preferably a diacid containing at least four carbon atoms, and is most preferably adipic acid, i.e.

most preferably, $$HOC(CH_2)_4COH$$

The polyamine above is preferably those polyamines obtained from condensation reactions of ethylene and propylene amine, or mixtures thereof, which polyamines have the structure:

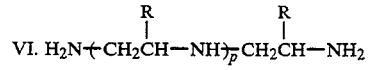

Wherein R is chosen at each occurrence, from the group consisting of H, $CH_3$, or mixtures thereof; and $p$ is an integer ranging from 1–8, preferably from 1–4, and most preferably 1–2.

Each such backbone polymer, or mixtures of said backbone polymers (since the reaction product can contain mixtures both in terms of different acids and/or different amines, and also with different molecular weights, both with the same or different difunctional acids and/or polyamine), must contain at least one, and preferably more than one secondary amine group, which is the preferred reaction site for cross-linking with the dialdehyde.

The reaction conditions and variants to obtain the backbone polymers are described below, and also have been described in the following references:

Gen. Offen. D.E. 2,456,638
U.S. Pat. No. 2,926,116
U.S. Pat. No. 2,926,154
U.S. Pat. No. 3,607,622, Each reference above is incorporated herein by reference.

It has been found particularly preferable to use in the reaction mixture with diacid, a molar ratio of P-amine: Di-acid ranging from about 0.90–1.10.

the Multifunctional Aldehyde

The multifunctional aldehyde contains two or more free aldehyde groups, but preferably is a difunctional aldehyde. The difunctional aldehyde has the structure:

Wherein x ranges from 0 to 6.

Preferably, the di-functional aldehyde is chosen from the group consisting of glutaraldehyde, glyoxal, or mixtures thereof. The glutaraldehyde is added to the base polymer, preferably the adipic acid, diethylenetriamine copolymers described above, such that the molar ratio of glutaraldehyde to backbone copolymer dimeric repeating unit ranges from about 0.10:1.0 to about 1.10:1.0.

The Cross-Linked Yankee Dryer Adhesive

By reacting the multi-functional aldehydes with the polyaminoamide backbone polymers, a cross-linked cationic yankee dryer adhesive is obtained having Structure I (as above), and preferably has the structure:

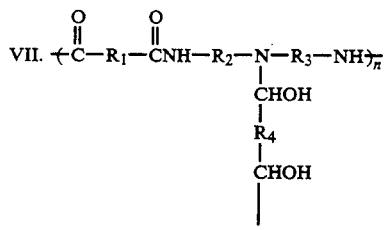

Wherein n, $R_1$, $R_2$, $R_3$, and $R_4$ are defined above.

Preferably, $R_1$ is $(CH_2)_{1-8}$; and most preferably $R_1$ is $(CH_2)_{2-5}$;

$R_2$ and $R_3$ are both

Wherein R is H, $CH_3$, or mixtures thereof; and $R_4$ is $(CH_2)_{0-4}$; and n is an integer providing a weight average molecular weight ranging from at least 15,000 to about 250,000.

Although the cross-linking may occur at less than stoichiometry, for example, at a mole ratio of dialdehyde to backbone polyaminoamide polymer of about 0.10: 1.0, it is preferred that the dialdehyde, most preferably glutaraldehyde, be added at a mole ratio, relative to backbone polyaminoamide polymer repeating unit, of at least 0.20: 1.0, and most preferably that the dialdehyde to polyaminoamide polymer repeating unit molar ratio be from about 0.20: 1.0 to about 0.50 to 1.0.

Even when the dialdehyde is in molar excess, not all of the secondary amine structures of the polyaminoamide polymer are necessarily completely cross-linked. Other structures may be possible in the adhesive, but the predominant structures are those shown above in Formula I and Formula VII.

When glyoxal is used as the dialdehyde, it is possible also to have cross-linking via the structure below:

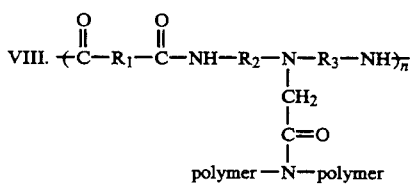

Where $R_1$, $R_2$, $R_3$, and n have the above meanings. Also, a reacted secondary amine structure, not completely cross-linked, may also be contained within a cross-linked polyaminoamide polymer, i.e.

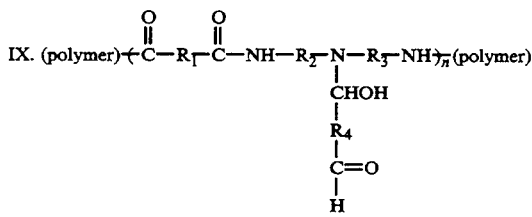

Again, where R1, $R_2$, $R_3$, $R_4$ and n are defined above. In formula IV on the previous page, the free aldehyde may be hydrated providing for the structure below:

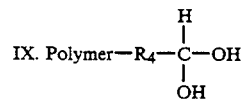

THE IMPROVED METHOD AND PROCESS

Our improved process for manufacturing tissue paper includes applying our halogen-free Yankee Dryer Adhesive to the metal surfaces of a drying drum, then contacting this adhesive and metal surface of the drying drum with a continuous paper web which paper web may be initially wet with water, then applying sufficient heat to the drying drum to drive off at least a portion of the water entrained in the paper web thereby drying this paper web and adhering the dried paper web to the metal surface of the drying drum by means of the Yankee Dryer adhesive, and then creping said dried paper web by contacting the paper web with a metal blade which compacts and removes the paper web from the metal dryer thereby forming tissue paper, wherein the improvement comprises using as the Yankee Dryer adhesives, the adhesives described above. These improved adhesives are applied either by spraying or brushing or otherwise applying or coating a liquid solution containing from about 0.1 to about 5.0 weight percent actives adhesive onto the metal surface so that the adhesive layer formed on the metal surface is of sufficient thickness to provide adhesion. The adhesive formulation is applied to the metal surfaces, preferably by spraying, but it may be brushed on or plated on with a coating knife or other techniques for applying the adhesive solutions or dispersions of our invention to the metal dryer immediately prior to the contact of the metal drum dryer with the continuous paper web. The paper web formed is that type of paper web known in the art and used traditionally to form tissue paper.

After the adhesive formulations are sprayed onto the heated metal drum and the paper web is contacted therewith, the drum which is heated to a sufficient temperature, usually by using steam, drives off a portion of the water contained in the web and simultaneously adheres the dried paper web to the metal surface immediately prior to contact with a metal knife used to crepe the paper and remove the paper from the drying drum surfaces. The metal knife is positioned such that the blade is not quite in contact with the metallic drying drum surfaces, but is close enough that it will contact and remove and crepe the tissue paper on the metal drum. The tissue is then continuously creped by the knife edge and removed from the drying drum.

Our invention, therefore, relates to an improved process for manufacturing tissue paper by applying the improved halogen and chloride free Yankee Dryer adhesive of this invention to the metal surface of a drying drum, then contacting said adhesive with a continuous paper web, then drying the paper web in contact with the adhesive on the metal drum, then creping the paper web by contacting the dried paper web with a metal blade which compacts and crepes the dried paper web to form tissue paper and removes tissue paper from the drying drum. The improvement in the process comprises using as the Yankee Dryer adhesives the adhesives described above.

In addition, to the adhesive formulations described above, these adhesive components are applied in formulations which may also contain components known as release agents. These release agents are normally any kind of hydrocarbon oil, mineral oil, vegetable oil, or any combination of this type of hydrocarbon material which is emulsified in the aqueous medium using typical emulsifiers for the purpose. In addition to these hydrocarbon oils, mineral oils, and vegetable oils, it has also been found useful that polyglycols, i.e. polyethylene oxides, may also be used by themselves or in combination with the hydrocarbon oils, mineral oils, and vegetable oils to make up release agents. These release agents may be formulated in water by emulsifying them in water either in the presence or absence of polyethylene oxides and using any combinations of the above hydrocarbon type oils. The release agents are normally formulated in water by incorporation of an emulsifier, such that the hydrocarbon release agent is contained in the water solution at from about 0.1 to 5.0 weight percent of the adhesive solution. This release agent may then be formulated with the preferred adhesive above so that the adhesive formulation may contain from about 0.1 to about 5.0 weight percent adhesive and from about 0.1 to about 5.0 weight percent of a release agent. Preferably, the weight ratio of adhesive polymer to release agent is from about 20:1 to about 1:20.

When using the formulated adhesive described above, it is preferable that the adhesive be added at a rate that would range, on an actives adhesive components basis from about 0.01 pounds to about 5.0 pounds per ton of dry basis fiber used in the tissue paper. The preferred adhesive add on rate is equal to about 0.05 to about 1.0 pounds per ton actives adhesive based on dry fiber. Most preferably, the preferred polymers of this invention are added at an adhesive add on rate of approximately 0.5 pound actives adhesive per ton dry basis cellulose fiber.

According to one embodiment of the invention, the crosslinked poly(aminoamides) of the invention are prepared as follows: A poly(aminoamide) backbone prepared from a 1.2/1.0–1.0/1.2 molar ratio of polyamine/diacid (dicarboxylate) is first diluted to 5–30% polymer and acidified to pH=6.5–8.0 and is known in the art. The preferred polaymine and diacid (dicarboxylate) of the invention are diethylenetriamine and adipic acid (or its esters), respectively. Additional preferred polyamines and diacids are disclosed herein. Sulfuric acid is typically used to adjust the pH of the backbone solution, but the identity of the acid is not critical to the invention. Acetic acid, phosphoric acid, and hydrochloric acid can also be used. The use of hydrochloric acid would, however, be less desirable since it would introduce chloride ions into the product.

The resulting solution is heated to the reaction temperature which preferably ranges from ambient temperature (23° C.) to 52° C. The polymer solution is then treated with a dialdehyde at a level of 0.1–1.1 moles/polymer repeat unit. The preferred dialdehydes are glyoxal and glutaraldehyde. Reaction between the backbone and crosslinker is continued until the desired molecular weight is achieved, at which time the reation mixture is diluted to 2–20% actives and acidified to pH=2.5–5.0. Once again, the identity of the acid used to adjust the pH of the product is not critical. Sulfuric acid, acetic acid, and citric acid have all been demonstrated to be useful. Phosphoric acid and hydrochloric acid can also be used as described above.

Preferred molecular weights for the crosslinked poly(amonoamides) prepared by the invention are $M_w \geq 15,000$, with the most preferred polymers ranging from 15,000 to 180,000. The adhesion of the resulting polymer varies depending on the molecular weight of the polymer and the application.

EXAMPLES

The benefits of the current invention will become obvious from the following examples:

1. This example demonstrates the improved adhesion provided by these resins. The relative adhesion of the creping adhesive compositions was measured by means of a peel test. In the test procedure, a paper sample was attached to metal panel with the adhesive of interest, and peeled at an angle of 90°. The paper substrate used in the test was a filter grade paper obtained from Filtration Sciences. This paper had a basis weight of 78 g/m$^2$. The metal panels, to which the paper was adhered, were standardized test panels produced from low carbon steel and supplied with a smooth finish (surface roughness of 0.2–0.3 um).

In the procedure, a 76 um film of the adhesive was uniformly applied to a steel test panel by means of an applicator. The paper test strip was carefully applied to the film and rolled once with a weighted roller to achieve uniform contact between the paper, adhesive, and metal panel. The panel with attached paper strip was then mounted on the peel testing apparatus, the surface of which was controlled to a temperature of 100° C. When the sample was stabilized at this temperature, the paper strip was peeled from the panel and the average force needed to accomplish the separation was recorded. The strip was peeled from the panel at a constant effective speed of 43 cm/min.

Results for the adhesives of this invention versus two commercially available PAE resins are given in Table I. The poly(aminoamides) crosslinked with glyoxal or glutaraldehyde show especially strong adhesion compared to Kymene 557H and Rezosol 8223. These commercially available PAE resins gave essentially no adhesion at the testing level of 1% actives. Significant adhesion is not obtained for these resins until the actives level is increased to at least 2.5%.

Additional adhesion results are summarized in Table 2, 3, and 4. Polymer synthesis conditions and characteristics are also provided in these Tables. Samples which were not crosslinked (3014–148, 3151-111, 3351-113, and 3415-29D) provided no adhesion, or only very weak adhesion of the paper test strips to the metal test panels. The samples which were crosslinked with glyoxal and glutaraldehyde produced strong adhesion, provided an acceptable molecular weight was attained.

Summary of Results in the above Tables

The dialdehyde crosslinked cationic polyaminoamide polymers of this invention provide for enhanced adhesion and are demonstrated as an improvement over the Yankee Dryer adhesives currently being used. The ability to control degree of cross-linking and adhesion by varying reaction conditions and mole ratios of reactants can provide additional benefits to the end user.

A problem with samples having very low molecular weight was the nonuniform or "spotty" nature of the adhesion which they provided. This resulted in portions of the paper strip which were poorly, or not adhered at all, to the metal panel, and other areas which were very strongly adhered. This type of behavior is evidenced by the large COV's within a test. In many instances, the strongly adhered areas resulted in paper failure. Paper failure typically occurs in the 100 g/in range. These "spotty" results are caused by molecular weights below 15,000. We do not believe this is due to the adhesive chemistries.

TABLE 1

Peel Adhesion Values at 1% Actives

| Sample | Mole Ratio (Amine/AA) | Backbone (Start pH) | Crosslinker | Mole Ratio (XLer/Amine) | Rxn Time (hr) | Rxn Temp (°C.) | Avg. Adhesion (g/in) | Std.Dev. (g/in) | COV (%) |
|---|---|---|---|---|---|---|---|---|---|
| 3014-148 | 1.09/1.0 | 10.7 | none | — | — | — | NA | — | — |
| 3014-155 | 1.09/1.0 | 7.4 | glyoxal | 1.0/1.0 | 1.5 | 50–51 | 69.1 | 6.0 | 8.7 |
| 3014-159 | 1.09/1.0 | 7.4 | glyoxal | 1.0/1.0 | 0.4 | 50–52 | 69.7 | 5.5 | 7.9 |
| 3014-167 | 1.09/1.0 | 7.4 | glyoxal | 0.5/1.0 | 3.0 | 48–51 | 19.8 | 3.3 | 16.7 |
| 3014-172 | 1.09/1.0 | 7.4 | glyoxal | 0.5/1.0 | 3.0 | 25–35 | 4.9 | 1.9 | 38.4 |
| 3014-180 | 1.09/1.0 | 7.4 | glutaraldehyde | 0.5/1.0 | 0.8 | 22–26 | 25.9 | 5.0 | 19.3 |
| 3014-185 | 1.09/1.0 | 6.9 | glutaraldehyde | 0.5/1.0 | 3.5 | 22.5–23.5 | 10.6 | 2.5 | 23.6 |
|  |  |  |  |  | 1.25 | 34–43 |  |  |  |
| Kymene 557H |  |  | epichlorohydrin |  |  |  | 0.2 | 0.1 |  |
| Rezosol 8223 |  |  | epichlorohydrin |  |  |  | NA | — | — |

Note: Kymene 557H adhesion at 2.5% actives = 25.6 g/in
Rezosol 8223 adhesion at 2.5% actives = 24.8 g/in
Std. Dev. = Standard Deviation
COV = Coefficient of Variance
NA = No Adhesion

TABLE 2

Sample Characteristics and Peel Adhesion Values.

| Sample | Mole Ratio (Amine/AA) | Crosslinker | Mole Ratio (XLer/Amine) | Rxn Time (hr) | Rxn Temp (°C.) | % Actives | Avg. Adhesion (g/in) | Std. Dev. (g/in) | COV (%) |
|---|---|---|---|---|---|---|---|---|---|
| 3151-111 | 1.09/1.0 | none | — | — | — | 50.00 | NA | | |
| 3151-113 | 0.9/1.0 | none | — | — | — | 50.00 | 1.2 | 0.1 | 7.0 |
| 3151-118A | 1.09/1.0 | glyoxal | 1.0/1.0 | 1.5 | 50 | 1.00 | 20.9 | 11.0 | 52.6 |
| | | | | | | 1.25 | 46.1 | 10.0 | 21.7 |
| | | | | | | 1.50 | F | | |
| 3151-118B | 1.09/1.0 | glyoxal | 1.0/1.0 | 3 | 50 | 1.00 | NA | | |
| | | | | | | 1.25 | 15.9 | 10.7 | 67.4 |
| | | | | | | 1.50 | 36.8 | 12.9 | 35.2 |
| 3151-124 | 0.9/1.0 | glyoxal | 1.0/1.0 | 1.5 | 55 | 0.75 | 2.0 | 1.2 | 60.3 |
| | | | | | | 1.00 | 33.1 | 4.3 | 13.1 |
| | | | | | | 1.25 | 70.2 | 20.3 | 28.8 |
| 3151-128 | 0.9/1.0 | glutar-aldehyde | 0.1/1.0 | 0.08 | 21 | 1.00 | NA | | |
| | | | | | | 1.50 | 17.1 | 9.0 | 52.6 |
| | | | | | | 1.75 | F | | |

NA = no adhesion
F = paper failure during test

TABLE 3

Experimental Characteristics and Adhesion Values for Samples Reacted with a 1:1 Mole Ratio of Glyoxal.

| Sample | Mole Ratio (Amine/AA) | BB Mol. Wt. (Mw) | Reaction Conditions Temp. (°C.) | Reaction Conditions Time (min) | Final Mol. Wt. (Mw) | % Actives | Avg. Adhesion (g/in) | Std. Dev. (g/in) | COV (%) |
|---|---|---|---|---|---|---|---|---|---|
| 3151-161A | 0.9/1.0 | 7100 | 50–52 | 90 | 9100 | 2.00 | NA | | |
| | | | | | | 5.00 | 4.8 | 1.3 | 26.8 |
| | | | | | | 10.00 | 9.9 | 5.0 | 50.8 |
| 3151-163A | 0.9/1.0 | 7100 | 50–52 | 90 | 8300 | 13.00 | 3.9 | 1.6 | 41.2 |
| 3151-171 | 0.9/1.0 | 8800 | 50–52 | 90 | 10400 | 10.00 | 6.9 | 1.3 | 19.3 |
| | | | | | | 15.00 | 8.7 | 5.5 | 63.1 |
| | | | | | | 19.60 | 10.1 | 2.2 | 21.4 |
| 3151-183 | 0.9/1.0 | 15200 | 50–52 | 90 | 22000 | 1.00 | NA | | |
| | | | | | | 3.00 | 23.4 | 7.4 | 31.4 |
| | | | | | | 4.00 | 27.9 | 10.3 | 37.0 |
| | | | | | | 5.00 | F | | |
| 3151-185 | 0.9/1.0 | 35900 | RT | 9 | 51900 | 1.00 | 7.3 | 3.0 | 40.1 |
| | | | | | | 1.25 | 35.0 | 4.3 | 12.2 |
| | | | | | | 1.50 | 67.3 | 18.6 | 27.6 |
| 3151-187 | 0.9/1.0 | 15200 | 65 | 90 | 12200 | 5.00 | 1.6 | 1.0 | 63.0 |
| | | | | | | 10.00 | 2.6 | 0.6 | 21.1 |
| | | | | | | 18.10 | 5.0 | 1.9 | 38.2 |
| 3415-29D | 0.91/1.0 | 125000 | | | | 5.00 | 3.3 | 0.5 | 16.3 |
| | | | | | | 10.00 | 15.5 | 2.4 | 15.8 |
| | | | | | | 14.80 | 31.8 | 4.2 | 13.2 |
| 34145-30 | 0.95/1.0 | 25000 | 28 | 31 | 34000 | 0.75 | 1.6 | 0.4 | 25.6 |
| | | | | | | 0.90 | 23.2 | 4.9 | 21.3 |
| | | | | | | 1.00 | 42.4 | 7.7 | 18.1 |
| 3415-31 | 0.93/1.0 | 42000 | 28 | 33 | 34000 | 1.00 | 2.6 | 0.8 | 32.0 |
| | | | | | | 1.25 | 34.7 | 10.4 | 30.0 |
| | | | | | | 1.50 | 74.1 | 9.7 | 13.1 |

TABLE 3-continued

Experimental Characteristics and Adhesion Values for Samples Reacted with a 1:1 Mole Ratio of Glyoxal.

| Sample | Mole Ratio (Amine/AA) | BB Mol. Wt. (Mw) | Reaction Conditions Temp. (°C.) | Time (min) | Final Mol. Wt. (Mw) | % Actives | Avg. Adhesion (g/in) | Std. Dev. (g/in) | COV (%) |
| --- | --- | --- | --- | --- | --- | --- | --- | --- | --- |
| 3415-32 | 0.97/1.0 | 15500 | 28 | 58 | 41000 | 0.75 | 4.2 | 1.2 | 28.5 |
|  |  |  |  |  |  | 1.00 | 41.4 | 5.3 | 12.9 |
|  |  |  |  |  |  | 1.10 | 66.1 | 9.9 | 15.0 |
| 3415-33 | 0.91/1.0 | 125000 | 28 | 1 | 73000 | 0.75 | 11.7 | 1.9 | 16.6 |
|  |  |  |  |  |  | 0.90 | 38.2 | 3.8 | 9.8 |
|  |  |  |  |  |  | 1.00 | 67.0 | 6.8 | 10.2 |

NA = no adhesion
F = paper failure during test

TABLE 4

Sample Characteristics and Adhesion Values for Glutaraldehyde Crosslinked Poly(aminoamides).

| Sample | BB /Mw | Glutaraldehyde Level | pH | % BB | Reaction Time | X link Mw | Adhesion % Actives | Mean (g/in) | Std Dev (g/in) |
| --- | --- | --- | --- | --- | --- | --- | --- | --- | --- |
| 3492-96 | .95/13800 | 0.05 | 7 | 10 | 30 min | 15900 | 8.0 | 8.8 | 3.2 |
| 98 | .95/13800 | 0.05 | 8 | 20 | 30 min | 17300 | 8.0 | sl |  |
| 100 | .95/13800 | 0.05 | 8 | 10 | 30 min | 18900 | 8.0 | sl |  |
| 102 | .95/13800 | 0.05 | 7 | 20 | 30 min | 17600 | 8.0 | 3.8 | 0.9 |
| 165 | .95/21500 | 0.1 | 7 | 8 | 3 hr | 44000 | 6.0 | 5.1 | 2.9 |
| 165B | .95/21500 | 0.1 | 7 | 8 | 2 hr | 51000 | 6.0 | NA |  |
| 101 | .95/13800 | 0.2 | 7 | 10 | 30 min | 67000 | 1.0 | 5.6 | 1.2 |
|  |  |  |  |  |  |  | 1.25 | 13.0 | 5.8 |
|  |  |  |  |  |  |  | 1.5 | 45.6 | 12.8 |
| 124 | 1.09/7000 | 0.2 | 7 | 10 | 30 min | 19800 | 8.0 | 3.5 | 0.4 |
| 129 | 1.09/7000 | 0.2 | 8 | 20 | 30 min | 32000 | 8.0 | sl |  |
| 162B | .95/13800 | 0.2 |  | 10 | 30 min | 41000 | 1.5 | sl |  |
|  |  |  |  |  |  |  | 1.75 | 18.8* | 9.1 |
| 190 | .95/21500 | 0.2 | 7 | 6.86 | 3 hr | 138000 | 1.0 | 19.6 | 3.9 |
|  |  |  |  |  |  |  | 3.0 | 70.3 | 22.2 |
|  |  |  |  |  |  |  | 6.0 | 78.2 | 16.9 |
| 159A | 1.09/7000 | 0.5 | 7 | 10 | 30 min | >150000 | 0.75 | 20.4 | 5.4 |
|  |  |  |  |  |  |  | 1.0 | 49.4** | 111.1 | diethylenetriamine/adipic acid
moles glutaraldehyde/moles amine
*1 of 5 runs resulted in paper failure
**2 of 6 runs runs resulted in paper failure 2. This example demonstrates the excellent rewettability of these resins. The glyoxalated resin, sample 3014-155, was subjected to differential scanning calorimetry (DSC) to determine its glass transition temperature ($T_g$). A summary of this work is given by FIGS. I and II. The sample was cast as a film directly in a DSC pan. After an initial temperature scan from ambient temperature to 200° C., the sample changed from a tacky material to a brittle solid. It became tacky again after a few minutes. The sample was allowed to sit under ambient conditions overnight in the open DSC pan. A DSC scan was performed the following day under a $N_2$ atmosphere at a heating rate of 10° C./min. The DSC thermal curve, as shown in FIG. I curve A, evidenced a broad endotherm which was indicative of the presence of water. After removal of water during this first run, a second run was completed as shown in FIG. I curve B. The dry sample evidenced a $T_g$ at approximately 100° C. The sample was again left out under ambient conditions in the open DSC pan. DSC scans were repeated the next day. The sample behavior was quite reproducible. The broad endotherm due to the presence of water was again evident (FIG. II curve C), and the $T_g$ of 100° C. was again found for the dry material (FIG. II curve D). This behavior demonstrates the rewettability of this new adhesive material.

Synthesis examples are given below:

Preparation of Poly(aminoamide) Backbone From Adipic Acid and Diethylenetriamine The general procedure of G. I. Keim (U.S. Pat. No. 2,926,116 and U.S. Pat. No. 2,926,154, Example I) was followed for preparing the poly(aminoamide) backbone. Diethylenetriamine (225 g, 2.18 moles) was placed in the reaction vessel and deionized water (50g) was added. The temperature of the solution rose to about 50° C. and was left to cool to room temperature. Adipic acid (292.0g, 2.0 moles) was then added slowly so that the temperature of the reaction mixture exotherm remained below boiling (90-98° C.). Additional water (82.6g) was added and the mixture was heated up slowly to 195-200° C. over about 4 hours to distill off water of solution and water of condensation. Nitrogen purging was done throughout the heating period. After about 5.5 hours of total heating time, 206 ml. of water had been collected. Heating was stopped and a slight vacuum was applied to the reaction vessel as the viscous mass cooled to 140° C. A small amount of water (3 ml.) distilled off during this time. When the temperature reached 140° C., deionized water (445g) was carefully added as the temperature gradually fell to about 100° C., while water was refluxing. Heating was resumed to keep the water refluxing as the remainder of the water was added (about 15 mins. addition time and refluxing was continued for 45 minutes longer). The solution was cooled to room temperature with stirring. A clear, bright yellow-solution was obtained (882g.) (pH=11.0) which contained 50-55% solids. Brookfield viscosity of the solution was 205 cps. Intrinsic viscosity was 0.08. Molecular weights were determined by GPC (a) based on PEG (polyethylene glycol) standards, MW 4600, MN 2050 and (b) based on polysaccharide standards (dextrans and pullulans), $M_w$–6700, $M_n$–4100.

Reaction of Poly(Aminoamide) With Glyoxal

A procedure similar to that described in U.S. Pat. No. 3,607,622 (example 3) (H. H. Espy) was employed except that the starting backbone polymer for this work was not reacted with acrylamide as was done in the Espy patent.

Poly(aminoamide) solution (50.5%) (120.0g, 0.284 mole) (pH11) was diluted with deionized water (40g) and was slowly neutralized with conc. sulfuric acid to pH 7.4 using ice bath cooling. Temperature of the solution during neutralization was kept at 25-30° C. The neutralized poly(aminoamide) solution was transferred to the reaction vessel using enough additional deionized water to make a total solution weight of 200g ( 30% polymer). Glyoxal solution (40%, 0.284 mole) was added all at once to the poly(aminoamide) solution (slight exotherm) and the mixture was heated to 50° C. over 20 minutes under nitrogen purging. Heating at 50° C. and nitrogen purging was continued for 1.5 hours longer while viscosity of the solution was observed. Viscosity slowly increased and torque of the constant speed stirring motor also gradually increased. At the end of the heating period, the reaction mixture was quenched by rapid addition of deionized water (230 g.). The solution was left to stir and cool over one hour and pH was adjusted to 3.5 using a small amount of conc. sulfuric acid (0.3g). The resulting product contained approximately 16.7% solids and had a Brookfield viscosity of 17.5 cps. Molecular weight of the polymer as determined by GPC was Ca) based on PEG standards, $M_w$–30,000, $M_n$–4,300 and (b) based on polysaccharide standards (dextrans and pullulans) $M_w$–36,000, $M_n$–8,000.

Reaction of Glutaraldehyde With cl Poly(aminoamide) Backbone

Poly(aminoamide) solution (50.18%, 50.0 g) (pH=11.0) was diluted with deionized water (29.0 g) and was slowly neutralized with concentrated $H_2SO_4$ (~4.3 g) to pH ~7.0 using ice bath cooling to keep the temperature at 20°-30° C. A portion of the neutralized poly(aminoamide) (31%, 50 g, 0.0735 moles diethylenetriamine) was transferred to the reaction vessel using enough additional deionized water (170.0 g) to make a 6.86% solids solution. This solution was stirred and equilibrated to 28-30° C. and glutaraldehyde (25% in $H_2O$) (5.9 g, 0.0147 moles) was added over 30 minutes via syringe pump. The viscosity of the reaction mixture slowly increased over time. After three hours the reaction was quenched by addition of 0.84M acetic acid/sodium acetate buffer (32.4 g). The reaction product had a dark red brown color. Concentration of the solution was calculated to be 6% adhesive, assuming all glutaraldehyde had reacted. Molecular weights of the polymer were determined by GPC using polysaccharide (dextran) standards. The $M_w$ of 138000 and the $M_n$ of 11300 were calculated for the polysaccharide-equivalent MWs less than 2 million dextran. About 0.5% of the polymer eluted above this MW and was not included in the MW distribution calculations.

Overall, the crosslinked cationic, halogen-free, polyaminoamide polymeric adhesives of this invention provide improved Yankee Dryer adhesive capabilities; much better than the currently used PAE resins, and not capable of chloride enhanced or induced corrosion of the steel cylinder, or drum dryer, or the creping blade.

Having described our invention, we claim:

1. A process for manufacturing tissue paper, the process including the steps of: applying to the metal surface of a drying drum a halogen-free Yankee Dryer adhesive which comprises a cross-linked polymer having a Structure I:

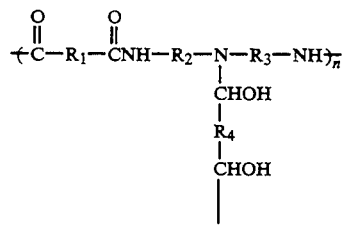

wherein:

$R_1$ is a linear or branched alkylene group containing from 1 to 8 carbon atoms;

$R_2$ and $R_3$ may be the same, or may be different, and are selected from the group of linear or branched alkylene groups containing from 2–8 carbon atoms; and $R_4$ is $(CH_2)_x$, where in x is 0 to 6; and wherein n is a whole number of sufficient size to yield a molecular weight of at least 15,000. applying to the metal surface of a drying drum; contacting said adhesive with a continuous paper web; drying the paper web; and creping the paper web with a metal blade which compacts the paper web to form tissue paper.

2. The process of claim 1, wherein:

$R_1$ is a linear or branched alkylene group containing from 2 to 5 carbon atoms;

$R_2$ and $R_3$ are the same, and are linear or branched alkylene groups containing from 2–4 carbon atoms;

$R_4$ is $(CH_2)_x$ wherein x is from 0–4; and n is an integer of sufficient size to achieve a molecular weight ranging between about 15,000–250,000.

3. The method of claim 1, wherein the Yankee Dryer adhesive comprises a crosslinked polymer having a Structure II:

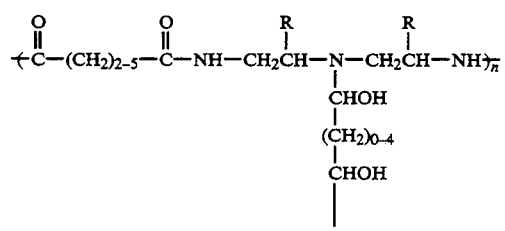

wherein R is, at each occurrence, chosen from H, $CH_3$, or mixtures thereof; and wherein n is an integer of sufficient size to obtain a molecular weight ranging between about 15,000 to about 150,000.

4. The method of claim 1, wherein the cross-linked polymer includes at least one repeating cross-linking mer unit selected from the group consisting of:

a) 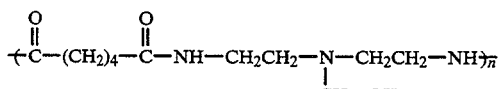
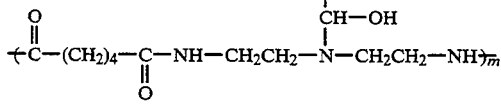

b) 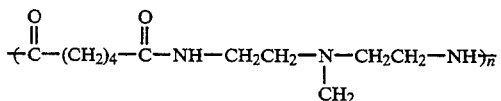
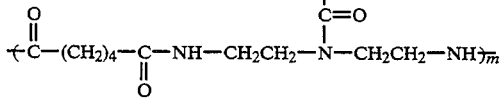

and c) 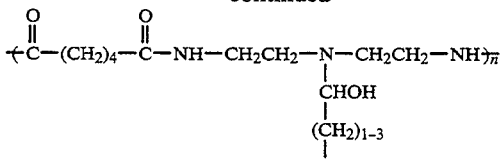

wherein the sum n+m is sufficient to obtain a weight average molecular weight ranging from about 15,000 to about 250,000.

5. The process of claim 4, wherein the cross-linked polymer is a 1.2:1 to 1:1.2 mole ratio copolymer of adipic acid and diethylenetriamine cross-linked with glutaraldehyde.

6. The process of claim 5, wherein the cross-linked polymer includes a glutaraldehyde cross-linked cationic backbone polymer of adipic acid and diethylenetriamine, said cross-linked polymer having a weight average molecular weight ranging from about 15,000 to about 250,000.

7. The process of claim 5, wherein the glutaraldehyde to cross-linked polymer repeating unit molar ratio ranges from about 0.10:1.0 to about 1.10:1.0, and the cross-linked polymer is formed with a mole ratio of adipic acid to diethylenetriamine ranging from about 1.10:1.0 to about 0.90:1.0.

8. The process of claim 7, wherein the cross-linked polymer has a weight average molecular weight ranging between about 20,000 to about 150,000.

* * * * *